United States Patent
Xu et al.

(10) Patent No.: US 11,860,719 B2
(45) Date of Patent: Jan. 2, 2024

(54) METHOD FOR IMPLEMENTING STORAGE SERVICE CONTINUITY IN STORAGE SYSTEM, FRONT-END INTERFACE CARD, AND STORAGE SYSTEM

(71) Applicant: Huawei Technologies Co., Ltd., Shenzhen (CN)

(72) Inventors: Qiming Xu, Chengdu (CN); Can Chen, Chengdu (CN); Song Yang, Shenzhen (CN); Linan Zhou, Hangzhou (CN); Dahong Yan, Chengdu (CN); Juntao Yang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/580,940

(22) Filed: Jan. 21, 2022

(65) Prior Publication Data
US 2022/0147412 A1 May 12, 2022

Related U.S. Application Data (63) Continuation of application No. PCT/CN2019/097260, filed on Jul. 23, 2019.

(51) Int. Cl.
| | | |
|---|---|---|
| *G06F 11/00* | (2006.01) | |
| *G06F 11/07* | (2006.01) | |
| *G06F 13/42* | (2006.01) | |
| *G06F 11/20* | (2006.01) | |

(52) U.S. Cl.
CPC ...... *G06F 11/0784* (2013.01); *G06F 11/0727* (2013.01); *G06F 11/2089* (2013.01); *G06F 13/4221* (2013.01); *G06F 2213/0026* (2013.01)

(58) Field of Classification Search
CPC ............ G06F 11/0727; G06F 11/0784; G06F 11/2089
See application file for complete search history.

(56) References Cited

U.S. PATENT DOCUMENTS

| | | | | |
|---|---|---|---|---|
| 7,827,441 B1 * | 11/2010 | Wenzel | ............... | G06F 11/1076 711/131 |
| 8,266,472 B2 * | 9/2012 | Bose | ................... | G06F 11/2092 714/4.11 |
| 8,650,328 B1 * | 2/2014 | Chatterjee | ............. | G06F 3/0613 710/5 |
| 2004/0268037 A1 | 12/2004 | Buchanan et al. | | |

(Continued)

FOREIGN PATENT DOCUMENTS

| | | |
|---|---|---|
| CN | 101102256 A | 1/2008 |
| CN | 106294031 A | 1/2017 |

(Continued)

*Primary Examiner* — Joshua P Lottich
(74) *Attorney, Agent, or Firm* — Conley Rose, P.C.

(57) ABSTRACT

A method for implementing storage service continuity in a storage system includes a front-end interface detecting a status of a first storage controller. The storage system includes the front-end interface card and a plurality of storage controllers. The front-end interface card communicates with the storage controllers, and the front-end interface card communicates with a host. When the first storage controller is in an abnormal state, the front-end interface card selects a second storage controller from the storage controllers for the host to process an access request of the host.

22 Claims, 6 Drawing Sheets

(56) References Cited

U.S. PATENT DOCUMENTS

| | | | |
|---|---|---|---|
| 2007/0124407 A1 | 5/2007 | Weber et al. | |
| 2008/0115008 A1* | 5/2008 | Daftardar | G06F 11/2092 |
| | | | 714/3 |
| 2008/0126615 A1 | 5/2008 | Sinclair et al. | |
| 2008/0155333 A1* | 6/2008 | Brundidge | G06F 11/0727 |
| | | | 714/36 |
| 2010/0082793 A1* | 4/2010 | Woods | G06F 11/2089 |
| | | | 709/239 |
| 2011/0238938 A1* | 9/2011 | Kloeppner | G06F 11/2089 |
| | | | 711/E12.103 |
| 2014/0244936 A1* | 8/2014 | Maharana | G06F 11/2089 |
| | | | 711/135 |
| 2014/0258608 A1* | 9/2014 | Viswanatha | G06F 11/00 |
| | | | 711/113 |
| 2015/0143164 A1* | 5/2015 | Veerla | G06F 11/2069 |
| | | | 714/54 |
| 2015/0242138 A1* | 8/2015 | McKean | G06F 12/0868 |
| | | | 709/216 |
| 2015/0269043 A1* | 9/2015 | Wilson | G06F 11/3006 |
| | | | 714/6.3 |
| 2016/0224437 A1* | 8/2016 | Nelogal | G06F 11/2089 |
| 2017/0046268 A1* | 2/2017 | Ummadi | G06F 11/2089 |
| 2017/0116097 A1* | 4/2017 | Keremane | G06F 11/0727 |
| 2017/0220249 A1* | 8/2017 | Jibbe | G06F 11/2089 |
| 2017/0242771 A1* | 8/2017 | Khemani | G06F 11/2092 |
| 2018/0120918 A1 | 5/2018 | Kwon et al. | |
| 2018/0143774 A1* | 5/2018 | Carson | G06F 11/2071 |
| 2018/0287912 A1* | 10/2018 | Zabarsky | H04L 41/12 |
| 2019/0245758 A1 | 8/2019 | Li | |
| 2020/0233763 A1* | 7/2020 | Zou | G06F 11/0727 |
| 2020/0409591 A1* | 12/2020 | Kulli | G06F 3/0655 |

FOREIGN PATENT DOCUMENTS

| | | |
|---|---|---|
| CN | 107423167 A | 12/2017 |
| EP | 1372076 A2 | 12/2003 |
| EP | 3206207 A1 | 8/2017 |

* cited by examiner

METHOD FOR IMPLEMENTING STORAGE SERVICE CONTINUITY IN STORAGE SYSTEM, FRONT-END INTERFACE CARD, AND STORAGE SYSTEM

CROSS-REFERENCE TO RELATED APPLICATIONS

This is a continuation of International Patent Application No. PCT/CN2019/097260 filed on Jul. 23, 2019, the disclosure of which is hereby incorporated by reference in its entirety.

TECHNICAL FIELD

The present disclosure relates to the field of information technologies, and in particular, to a method for implementing storage service continuity in a storage system.

BACKGROUND

Figure 1:
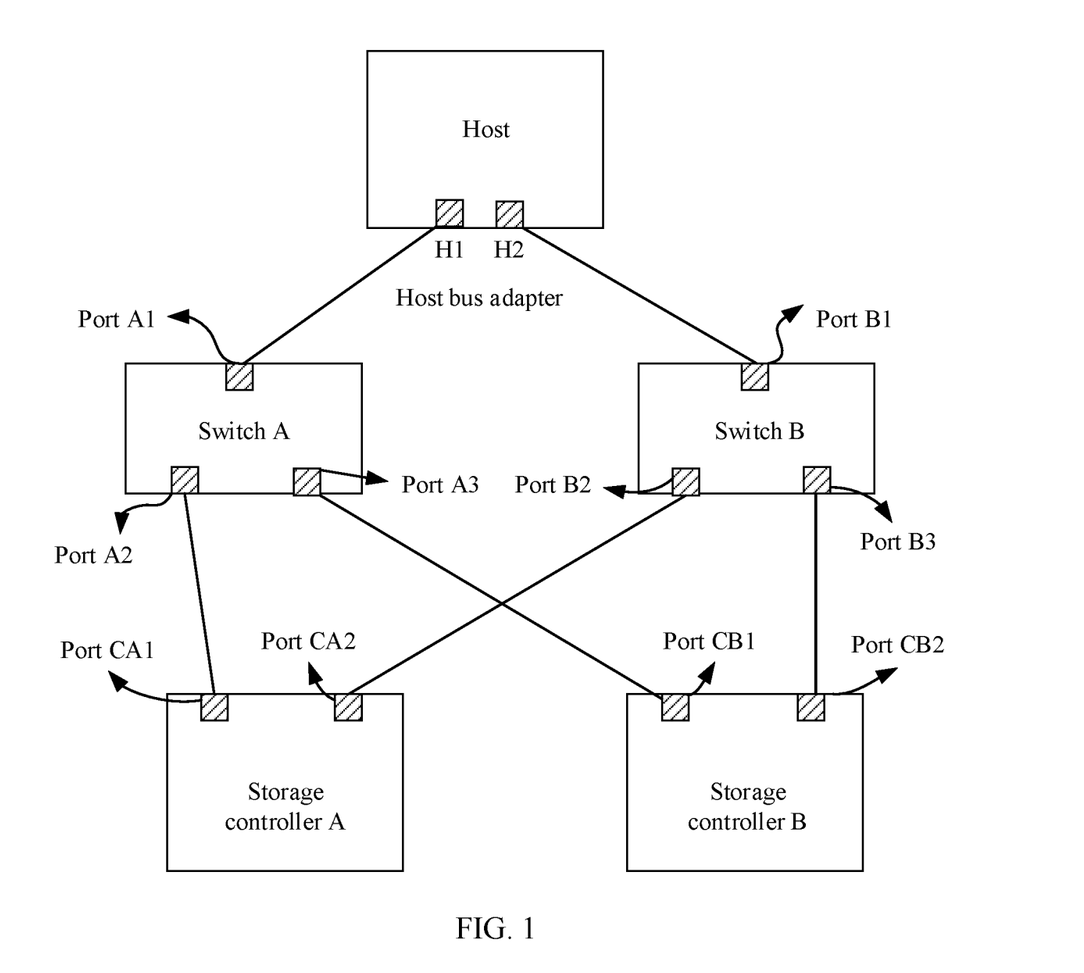
FIG. 1 is a schematic architecture diagram of a storage system and a host.

As shown in FIG. 1, a storage system includes a storage controller A and a storage controller B. The storage controller A includes two front-end ports: a port CA1 and a port CA2. The storage controller B includes two front-end ports: a port CB1 and a port CB2. The port CA1 is connected to a port A2 of a switch A, and the port CA2 is connected to a port B2 of a switch B. The port CB1 is connected to a port A3 of the switch A, and the port CB2 is connected to a port B3 of the switch B. The switch A is connected to a host bus adapter (HBA) H1 of a host through a port A1, and the switch B is connected to an HBA H2 of the host through a port B1. The host communicates with the storage system through the connection.

The storage controller A changes to an abnormal state. For example, the storage controller A is faulty, the storage controller A is unavailable due to an upgrade or the like, or the storage controller does not respond due to a software problem. Because the storage controller A changes to the abnormal state, the storage controller B needs to replace the storage controller A to process an access request from the host. In other approaches, when the storage controller A is faulty, and a link between the port CA1 and the H1 of the host is disconnected. The switch A detects that the port CA1 is disconnected, and notifies the H1 of the host of a link disconnection event. After receiving the notification, the H1 of the host suspends delivering the access request to the storage controller A, and starts a timing task. When detecting that the storage controller A is in the abnormal state, the storage system uses the World Wide Port Name (WWPN) of the port CA1 to register with the switch A for the port CB1 of the storage controller B. After receiving the registration, the switch determines the CA1 is recovered to a normal state, and notifies the H1 of the host that the link is recovered. After receiving the notification, the H1 of the host continues to send the access request.

In the other approaches, after a storage controller changes from a normal state to an abnormal state, a host access request is interrupted in a process in which a storage system switches the storage controller, thereby affecting service continuity.

SUMMARY

The present disclosure provides a method for implementing storage service continuity in a storage system, to ensure that when a storage controller of the storage system changes from a normal state to an abnormal state, a host access request is not interrupted in a process in which the storage system switches the storage controller, thereby improving the service continuity.

According to a first aspect, a method for implementing storage service continuity in a storage system is provided, where the storage system includes a front-end interface card and a plurality of storage controllers, the front-end interface card communicates with the plurality of storage controllers, and the front-end interface card communicates with a host. In the method, the front-end interface card detects a status of a first storage controller, where the first storage controller is a storage controller that is in the plurality of storage controllers and that is configured to process an access request of the host, and when the first storage controller is in an abnormal state, the front-end interface card selects a second storage controller from the plurality of storage controllers for the host to process the access request of the host, where the second storage controller is a storage controller that is in the plurality of storage controllers and that is different from the first storage controller. In this solution, the plurality of storage controllers share one front-end interface card. When a storage controller of the plurality of storage controllers changes from a normal state to the abnormal state, and when the storage system switches the storage controller, the host does not sense the switching on the storage controller of the storage system, and the host does not need to stop sending the access request to the storage system, thereby improving service continuity. This embodiment of the present disclosure can also avoid a problem that switching of a storage controller fails because a link cannot be established between a host and the storage controller due to compatibility of host software.

In an optional implementation, when the first storage controller is in the abnormal state, the front-end interface card sends an access request error message to the host, where the access request error message is used to report an error status of the access request, and the front-end interface card receives the access request that is resent by the host in response to the access request error message. This solution can ensure accuracy of service processing during switching of a storage controller.

In an optional implementation, when the first storage controller is in the abnormal state and the front-end interface card has not completely obtained a result of the access request that is of the host and that is processed by the first storage controller, the front-end interface card obtains, from the second storage controller, a processing result of the access request of the host, and, selects, from the processing result of the access request of the host, the not completely obtained result of the access request that is of the host and that is processed by the first storage controller. In this solution, the front-end interface card switches, based on a case in which the first storage controller in the abnormal state processes the access request of the host, to the second storage controller to continue to process the access request that is not completely processed by the first storage controller. This ensures service continuity.

In an optional implementation, when the first storage controller changes from the abnormal state to a normal state, the front-end interface card switches a storage controller that processes a service request of the host from the second storage controller to the first storage controller.

In an optional implementation, the front-end interface card is connected to the host through an Ethernet.

In an optional implementation, the front-end interface card is connected to the host through a fiber channel.

In an optional implementation, the front-end interface card is connected to the plurality of storage controllers through a peripheral component interconnect express bus.

In an optional implementation, that the front-end interface card selects a second storage controller from the plurality of storage controllers for the host to process the access request of the host includes selecting, by the front-end interface card based on performance of the plurality of storage controllers, the second storage controller. This solution can ensure storage performance after a storage controller is switched.

In an optional implementation, the first storage controller mirrors data in a cache of the first storage controller to at least one storage controller in the plurality of storage controllers other than the first storage controller, and the second storage controller is one of the at least one storage controller. This solution can ensure that the second storage controller can quickly take over work of the first storage controller.

In an optional implementation, the front-end interface card sends, to at least one storage controller in the plurality of storage controllers other than the first storage controller, the access request that is sent by the host to the first storage controller, and the second storage controller is one of the at least one storage controller. This solution can ensure that the second storage controller can quickly take over work of the first storage controller.

According to a second aspect, a front-end interface card in a storage system is provided, where the storage system includes the front-end interface card and a plurality of storage controllers, the front-end interface card includes a first interface and a second interface, where the first interface is configured to communicate with a host, and the second interface is configured to communicate with the plurality of storage controllers, and the front-end interface card further includes a module configured to perform the method according to any one of the first aspect or the possible implementations of the first aspect.

According to a third aspect, a front-end interface card in a storage system is provided, where the storage system includes the front-end interface card and a plurality of storage controllers, the front-end interface card includes a first interface and a second interface, where the first interface is configured to communicate with a host, and the second interface is configured to communicate with the plurality of storage controllers, and the front-end interface card further includes a processor, where the processor is configured to communicate with the first interface and the second interface, and the processor is further configured to perform the method according to any one of the first aspect or the possible implementations of the first aspect.

According to a fourth aspect, a chip is provided, where the chip includes a first interface and a second interface, where the first interface is configured to communicate with a host, and the second interface is configured to communicate with a plurality of storage controllers of a storage system, and the chip further includes a processor, where the processor is configured to communicate with the first interface and the second interface, and the processor is further configured to perform the method according to any one of the first aspect or the possible implementations of the first aspect.

According to a fifth aspect, a storage system is provided, where the storage system includes a front-end interface card and a plurality of storage controllers, the front-end interface card is configured to communicate with the plurality of storage controllers and communicate with a host, and the front-end interface card is further configured to perform the method according to any one of the first aspect or the possible implementations of the first aspect.

According to a sixth aspect, a computer-readable storage medium is provided, where the computer-readable storage medium stores an instruction, and when running the instruction, a processor is configured to perform the method according to any one of the first aspect or the possible implementations of the first aspect.

According to a seventh aspect, a computer program product including an instruction is provided, and when running the instruction stored in the computer program product, a processor is configured to perform the method according to any one of the first aspect or the possible implementations of the first aspect.

DESCRIPTION OF EMBODIMENTS

The following describes technical solutions in embodiments of the present disclosure with reference to accompanying drawings.

First, a storage system applicable to the embodiments of the present disclosure is described.

Figure 2:
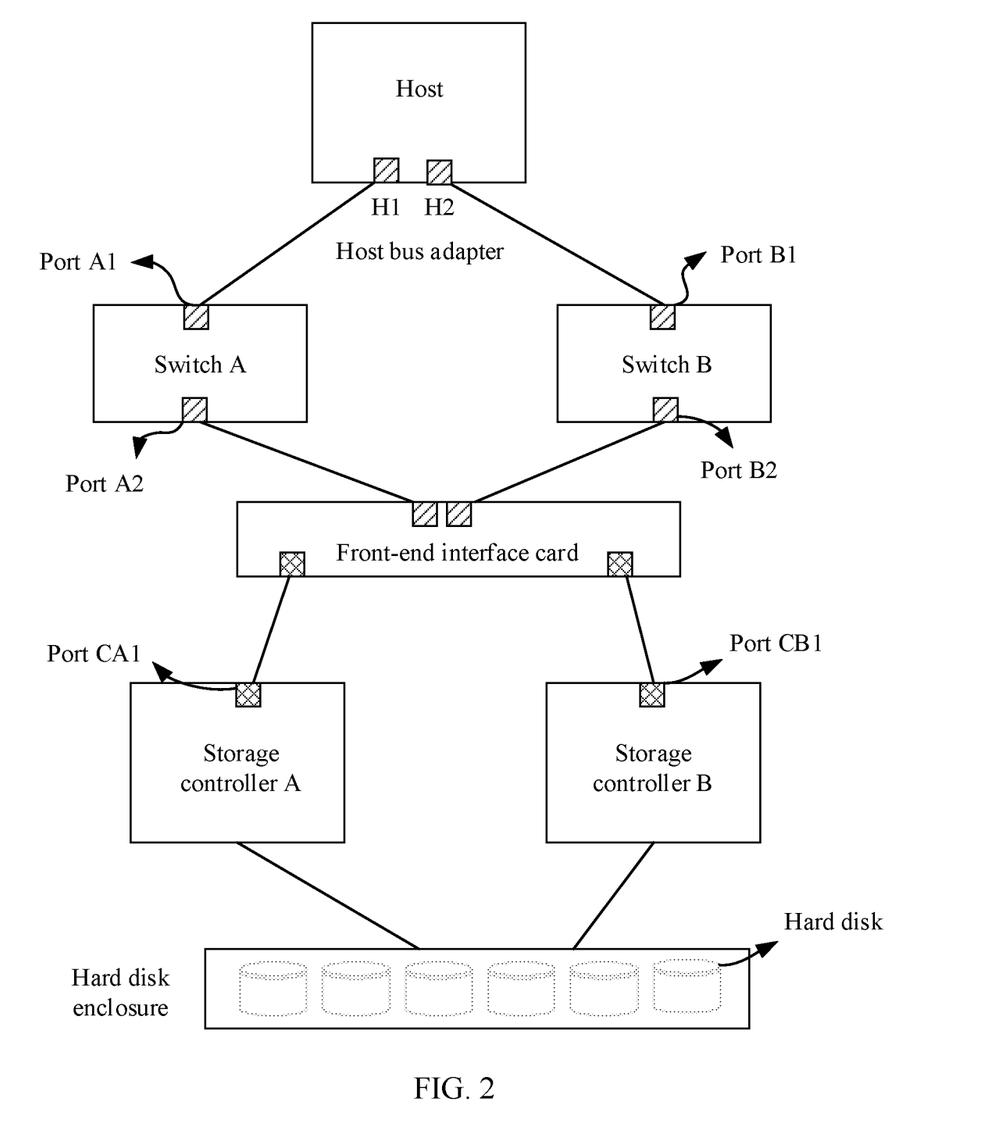
FIG. 2 is a schematic architecture diagram of a storage system and a host according to an embodiment of the present disclosure.

As shown in FIG. 2, the storage system in this embodiment of the present disclosure may be a storage array (for example, an Oceanstor® 18000 series of Huawei®, an Oceanstor® Dorado® series of Huawei®, or the like). The storage system includes a front-end interface card, a storage controller A, a storage controller B, and a hard disk enclosure. The front-end interface card is separately connected to an interface CA1 of the storage controller A and an interface CB1 of the storage controller B, and the connection may be implemented through a Peripheral Component Interconnect Express (PCIe) bus. In this case, the interface CA1 of the storage controller A, the interface CB1 of the storage controller B, and interfaces that are of the front-end interface card and that are connected to the storage controller A and the storage controller B are PCIe interfaces. The storage controller A and the storage controller B are separately connected to the hard disk enclosure. The hard disk enclosure includes a plurality of hard disks, and the hard disks include a solid-state disk (SSD) and/or a mechanical hard disk. Each of the storage controller A and the storage controller B may be connected to the hard disk enclosure through the PCIe bus, a fiber channel (FC), an Ethernet, infinite bandwidth (IB), or a Serial Attached Small Computer System Interface (SCSI) (SAS) protocol. The Ethernet connection may be remote direct memory access (RDMA) over Converged Ethernet (RoCE). Based on the foregoing connection manner, the storage controller A and the storage controller B may use a SAS protocol, a non-volatile memory express (NVMe) standard protocol, a proprietary protocol, or the like. The front-end interface card may be connected to an HBA of a host by using a switch A and a switch B, and the front-end interface card may also be directly connected to the HBA of the host. An interface used by the front-end interface card to communicate with the host may be an FC interface or an Ethernet interface, or may be an IB interface. In this embodiment of the present disclosure, the front-end interface card is a shared interface card, that is, a plurality of storage controllers is connected to the front-end interface card, and communicate with the host by using the front-end interface card.

Figure 3:
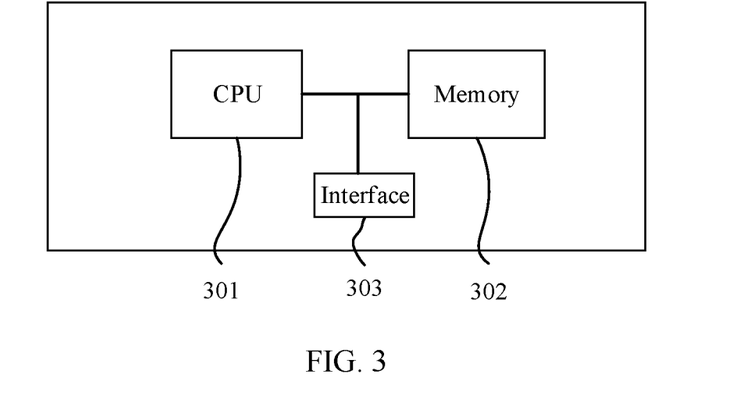
FIG. 3 is a schematic structural diagram of a storage controller according to an embodiment of the present disclosure.

A structure of the storage controller in this embodiment of the present disclosure is shown in FIG. 3. The storage controller includes a central processing unit (CPU) 301, a memory 302, and an interface 303. The memory 302 may be configured to cache data and an access instruction that are of the storage controller. In addition, in this embodiment of the present disclosure, the memory 302 is further configured to store a driver of the front-end interface card. The interface 303 is configured to communicate with the front-end interface card, and the interface 303 may be a port supporting a PCIe protocol. The storage controller further includes an interface configured to communicate with the hard disk enclosure, and may be the PCIe interface, the FC interface, the Ethernet interface, the IB interface, or the like.

Figure 4:
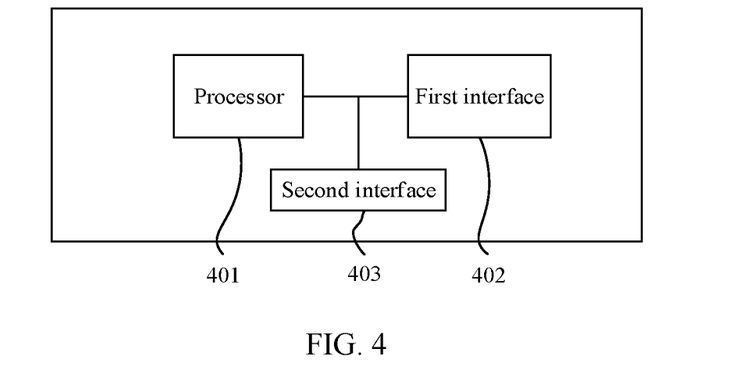
FIG. 4 is a schematic structural diagram of a front-end interface card according to an embodiment of the present disclosure.

A structure of the front-end interface card is shown in FIG. 4. The front-end interface card includes a processor 401, a first interface 402, and a second interface 403. The first interface 402 may be the FC interface, the Ethernet interface, or the IB interface, and the first interface 402 is configured to communicate with the HBA of the host. The second interface 402 may be the PCIe interface, and is configured to communicate with the storage controller A and the storage controller B. In addition, the processor 401 may be a field-programmable gate array (FPGA), an application-specific integrated circuit (ASIC), a CPU, or other hardware. Alternatively, an FPGA or other hardware and a CPU together serve as a processor. The processor 401 is configured to implement functions of the front-end interface card in this embodiment of the present disclosure. In this embodiment of the present disclosure, there may be one or more first interfaces 402 and one or more second interfaces 403. One first interface 402 communicates with one HBA. In an implementation, a plurality of HBAs or switches may also reuse one first interface 402, namely, the plurality of HBAs communicate with one first interface 402. This is not limited in this embodiment of the present disclosure. The driver of the front-end interface card in this embodiment of the present disclosure runs in the storage controller shown in FIG. 3. The front-end interface card in this embodiment of the present disclosure is used as a network interface card of the storage controller to communicate with the host. In an implementation of the front-end interface card in this embodiment of the present disclosure, the second interface 403 may directly communicate with the storage controller, and may be connected to the storage controller by using a switching device. For example, the second interface 403 is the PCIe interface, and a PCIe switching device is not required for communication between the second interface 403 and the storage controller. In this embodiment of the present disclosure, in an implementation, the front-end interface card does not require a dynamic random-access memory (RAM), and does not need to cache access request-level data, that is, the front-end interface card does not need to cache data carried in a write request or data requested by a read request.

Figure 5:
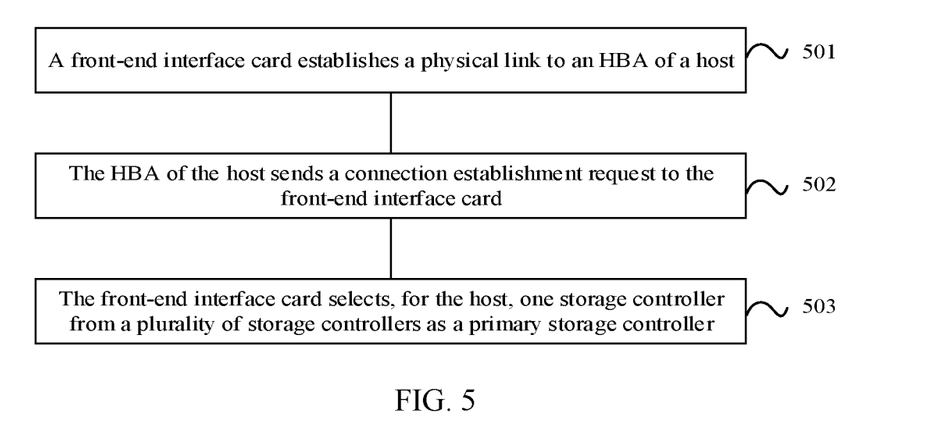
FIG. 5 is a schematic diagram of communication between a host and a storage system.

In this embodiment of the present disclosure, as shown in FIG. 5, steps for implementing communication between the host and the storage system are as follows.

Step 501: The front-end interface card establishes a physical link to the HBA of the host.

That front-end interface card establishes a physical link to the HBA of the host includes operations such as rate coordination and link initialization.

Step 502: The HBA of the host sends a connection establishment request to the front-end interface card.

After the front-end interface card establishes a physical link to the HBA of the host, the HBA of the host sends the connection establishment request to the front-end interface card, where the request is used to communicate with the storage system.

Step 503: The front-end interface card selects, for the host, one storage controller from the plurality of storage controllers as a primary storage controller.

The front-end interface card selects one storage controller from the plurality of storage controllers as the primary storage controller, to manage a connection established between the storage system and the host, and synchronize the connection to another storage controller of the storage system. With reference to the embodiment shown in FIG. 2, for example, the storage controller A is selected as the primary storage controller.

In an implementation, the storage controller of the storage system establishes a connection to the HBA of the host, namely, a session is established. In this case, the storage controller directly performs a session with the HBA of the host. In another implementation, the front-end interface card establishes a connection to the HBA of the host, namely, a session is established. The front-end interface card establishes a virtual connection to each storage controller, that is, the front-end interface card that represents the storage controller establishes a connection to the HBA of the host. When the front-end interface card receives a session notification sent by the HBA of the host, the front-end interface card notifies the storage controller of the storage system that the storage system has established the connection to the host, namely, the front-end interface card that represents the storage system establishes a connection to the host.

In this embodiment of the present disclosure, the front-end interface card receives an access request sent by the host, determines, based on address information carried in the access request, a storage controller that processes the access request, and sends the access request to the corresponding storage controller for processing. In this embodiment of the present disclosure, the storage controller is the storage controller A. The access request may be a read request, a write request, or a management request. The management request in this embodiment of the present disclosure is used by the host to send a management command to the storage system.

In this embodiment of the present disclosure, in an implementation, the front-end interface card distributes the access requests to the storage system at a granularity level of an access request. That the front-end interface card distributes the access requests to the storage system at a granularity level of an access request means that the front-end interface card selects the corresponding storage controller for the access request sent by the host. In a specific implementation, the storage controller that processes the access request may be determined based on the address information carried in the access request. The corresponding storage controller that processes the access request is also referred to as a home storage controller. In this way, the front-end interface card may directly send the access request to the corresponding storage controller, and there is no need to forward the access request between the storage controllers. This improves access request processing efficiency, and reduces an access request processing delay. In this implementation, the front-end interface card stores a correspondence between an address information of an access request and a storage controller. In this implementation, the front-end interface card may send, to different storage controllers for parallel processing, the access request delivered by the host. This improves the access request processing efficiency, and reduces the access request processing delay. In another implementation, the front-end interface card distributes the access requests to the storage system at a granularity level of a link. That the front-end interface card distributes the access requests to the storage system at a granularity level of a link means that the front-end interface card distributes access requests from a same link of the host to a same storage controller for processing. That is, each time a link is established, the front-end interface card specifies one storage controller to process all access requests from the link.

Figure 6:
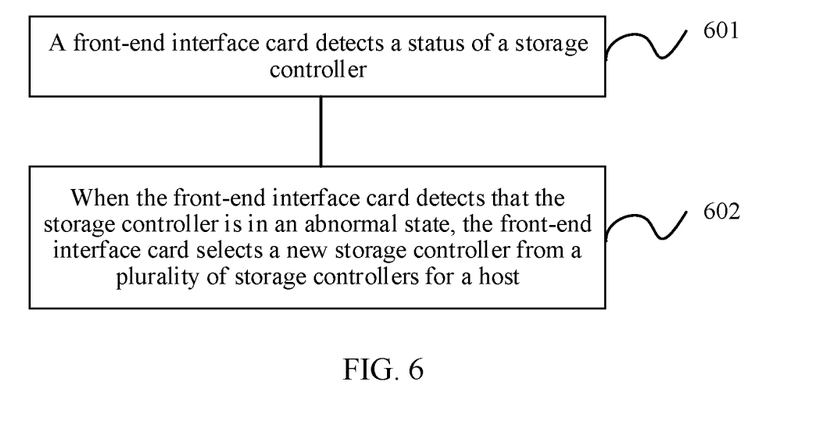
FIG. 6 is a schematic flowchart of implementing storage service continuity according to an embodiment of the present disclosure.

As shown in FIG. 6, in an embodiment of the present disclosure, a front-end interface card performs the following operations to maintain storage service continuity.

Step 601: The front-end interface card detects a status of a storage controller.

The front-end interface card detects whether the storage controller is in a normal state. The storage controller changes from the normal state to an abnormal state due to various reasons. For example, the storage controller changes to an offline state due to a fault, a power failure, or an upgrade, or the storage controller does not respond due to software issues.

Step 602: When the front-end interface card detects that the storage controller is in the abnormal state, the front-end interface card selects a new storage controller from a plurality of storage controllers for a host.

For example, when a first storage controller is in the abnormal state, the front-end interface card selects a new storage controller from the plurality of storage controllers for the host to process an access request of the host.

In this embodiment of the present disclosure, the plurality of storage controllers share one front-end interface card. When a storage controller of the front-end interface card changes from the normal state to the abnormal state, and when a storage system switches the storage controller, the host does not know that the storage system switches the storage controller. Therefore, the host does not need to stop sending the access request to the storage system. This improves service continuity. This embodiment of the present disclosure can also avoid a problem that switching of a storage controller fails because a link cannot be established between a host and the storage controller due to compatibility of host software.

Based on the embodiment shown in FIG. 6, further, the front-end interface card maintains a storage controller status table that is used to record a status of a storage controller in the storage system. Further, the front-end interface card may further maintain a storage controller switching table that is used to record a backup storage controller of a current storage controller in case the current storage controller changes to the abnormal state. The backup storage controller is a storage controller that may replace the current storage controller. The front-end interface card may determine, based on performance, load, and the like of each storage controller, the backup storage controller for the current storage controller, or set the backup storage controller and record a backup relationship in the storage controller switching table.

Therefore, in step 602, the front-end interface card may select the new storage controller, namely, the backup storage controller, based on the storage controller switching table.

Figure 7:
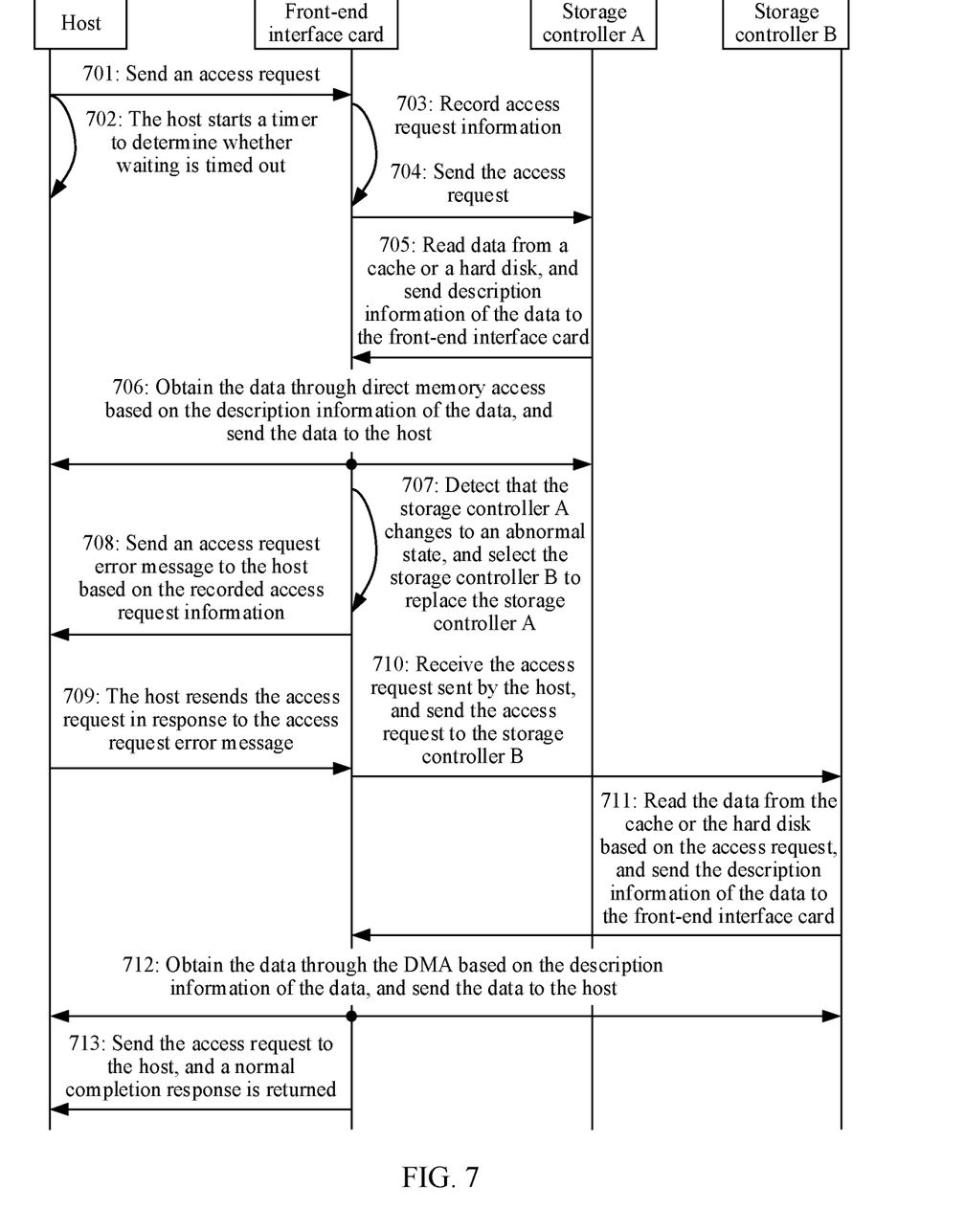
FIG. 7 is a schematic flowchart of processing an access request sent by a host in a storage controller switching process according to an embodiment of the present disclosure.

An embodiment of the present disclosure provides a plurality of implementations that are used to process an access request sent by a host in a storage controller switching process. Various implementations are described with reference to FIG. 2 in this embodiment of the present disclosure. An implementation, as shown in FIG. 7, includes the following steps.

Step 701: A host sends an access request.

The access request may be a read request, a write request, or a management request. In this embodiment of the present disclosure, the read request is used as an example for description.

Step 702: The host starts a timer to determine whether waiting is timed out.

The host starts the timer to determine whether a storage system returns a response within a predetermined time period.

Step 703: A front-end interface card records access request information.

In this embodiment of the present disclosure, the access request information includes one or more of a type of the access request, a source address for sending the access request, or a destination address of the access request.

Step 704: The front-end interface card sends the access request to a storage controller A.

Step 705: The storage controller A reads data from a cache or a hard disk, and sends description information of the data to the front-end interface card.

In this embodiment of the present disclosure, the cache may be located in the memory 302 shown in FIG. 3. The hard disk is shown in FIG. 2.

The description information of the data includes an address of the data in the cache and a data length.

Step 706: The front-end interface card obtains the data through direct memory access (DMA) based on the description information of the data, and sends the data to the host.

Step 707: The front-end interface card detects that the storage controller A changes to an abnormal state, and selects a storage controller B to replace the storage controller A.

The front-end interface card detects that the storage controller A changes to the abnormal state, and selects the storage controller B to replace the storage controller A, that is, the front-end interface card switches the storage controller A to the storage controller B.

Step 708: The front-end interface card sends an access request error message to the host based on the recorded access request information.

The access request error message is used to report an error status of the access request. In this embodiment of the present disclosure, the access request error message is a read request error message.

Step 709: The host resends the access request in response to the access request error message.

Step 710: The front-end interface card receives the access request sent by the host, and sends the access request to the storage controller B.

Step 711: The storage controller B reads the data from the cache or the hard disk based on the access request, and sends the description information of the data to the front-end interface card.

Step 712: The front-end interface card obtains the data through the DMA based on the description information of the data, and sends the data to the host.

Step 713: The front-end interface card sends the access request to the host, and a normal completion response is returned.

In this embodiment of the present disclosure, in an implementation, the front-end interface card does not need a dynamic RAM, and does not need to cache access request-level data, that is, the front-end interface card does not need to cache data carried in the write request or data requested by the read request.

In another scenario, the storage controller A receives the access request sent by the front-end interface card, but step 705 has not been performed. That is, the storage controller A has not processed the access request, or has read the data from the cache or the hard disk, but has not sent the description information of the data to the front-end interface card. In this case, the storage controller A is faulty. For a subsequent implementation, refer to step 707 to step 713 in the implementation in FIG. 7. Details are not described herein again.

For another implementation, refer to step 701 to step 711 in the implementation in FIG. 7. In this implementation, different from step 712, when the front-end interface card has not completely obtained a result of the access request that is of the host and that is processed by the storage controller A, the front-end interface card obtains, from the storage controller B, a processing result of the access request of the host, and selects, from the processing result that is obtained by the storage controller B and that is of the access request of the host, the not completely obtained result of the access request that is of the host and that is processed by the storage controller A. The front-end interface card sends, to the host, the not completely obtained result of the access request that is of the host and that is processed by the storage controller A. Because the storage controller A changes to the abnormal state, the front-end interface card has not completely obtained the result of the access request that is of the host and that is processed by the storage controller A. The data of the read request is used as an example. The front-end interface card obtains only some data of the read request, and sends some data of the read request to the host. Therefore, in this implementation, with reference to step 701 to step 711, the front-end interface card obtains the data in the DMA manner based on the description information of the data. The front-end interface card selects, based on some data that is of the read request and that has been sent to the host, the not completely obtained processing result of the access request of the host from the processing result that is obtained by the storage controller B and that is of the access request of the host, and supplements data that has not been completely sent to the host and that is of the access request. After supplementing the data that is of the request and that has not been sent to the host, the front-end interface card sends the access request to the host, and the normal completion response is returned. For example, the data of the read request of the host is 000011110001, and the front-end interface card obtains 000011 from the storage controller A and sends 000011 to the host. The front-end interface card obtains, from the storage controller B, the data 000011110001 of the read request of the host. Because the front-end interface card has sent 000011 to the host, the front-end interface card only needs to select 110001 from the data 000011110001 that is of the read request of the host and that is obtained from the storage controller B, and send 110001 to the host.

In this embodiment of the present disclosure, the front-end interface card detects a status of a storage controller, and when detecting that the storage controller A recovers from the abnormal state to the normal state, the front-end interface card may switch the storage controller B to the storage controller A.

Figure 8:
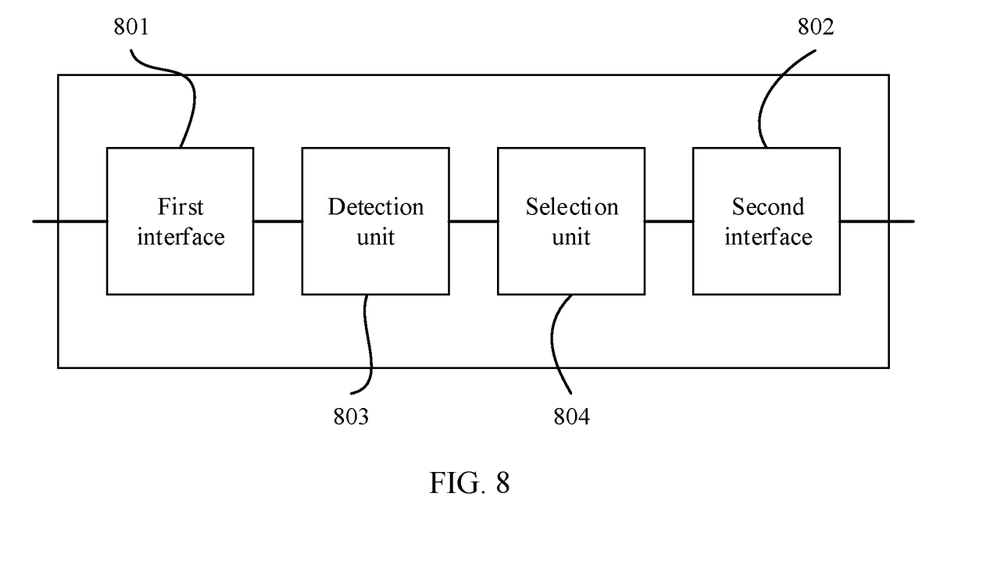
FIG. 8 is a schematic structural diagram of another front-end interface card according to an embodiment of the present disclosure.

Another embodiment of the present disclosure provides a front-end interface card of a storage system. As shown in FIG. 8, the front-end interface card includes a first interface 801, a second interface 802, a detection unit 803, and a selection unit 804. The first interface 801 is configured to communicate with a host, and the second interface 802 is configured to communicate with a plurality of storage controllers of the storage system. The detection unit 803 is configured to detect a status of a first storage controller, where the first storage controller is a storage controller that is in the plurality of storage controllers and that is configured to process an access request of the host. The selection unit 804 is configured to, when the first storage controller is in an abnormal state, select a second storage controller from the plurality of storage controllers for the host to process the access request of the host, where the second storage controller is a storage controller that is in the plurality of storage controllers and that is different from the first storage controller. The selection unit 804 is configured to select the second storage controller based on performance of the plurality of storage controllers. Further, the front-end interface card further includes a sending unit and a receiving unit. The sending unit is configured to send an access request error message to the host when the first storage controller is in the abnormal state, where the access request error message is used to report an error status of the access request. The receiving unit is configured to receive the access request that is resent by the host in response to the access request error message.

Based on the front-end interface card shown in FIG. 8, the front-end interface card further includes an obtaining unit. The obtaining unit is configured to, when the first storage controller is in the abnormal state and the front-end interface card has not completely obtained a result of the access request that is of the host and that is processed by the first storage controller, obtain, from the second storage controller, a processing result of the access request of the host. The selection unit 804 is further configured to select, from the processing result of the access request of the host, the not completely obtained result of the access request that is of the host and that is processed by the first storage controller.

Based on the front-end interface card shown in FIG. 8, the front-end interface card further includes a switching unit. The switching unit is configured to, when the first storage controller changes from the abnormal state to a normal state, switch a storage controller that processes a service request of the host from the second storage controller to the first storage controller.

In the front-end interface card shown in FIG. 8, the first interface 801 is an Ethernet interface or an FC interface. In another implementation, the second interface 802 is a PCIe interface.

For a specific implementation of the front-end interface card shown in FIG. 8, refer to the implementation of the front-end interface card described in the foregoing embodiment of the present disclosure. Details are not described herein again.

The present disclosure provides a chip, and the chip includes a first interface and a second interface. The first interface is configured to communicate with a host, and the second interface is configured to communicate with a plurality of storage controllers of a storage system. The chip further includes a processor. The processor is configured to implement various implementations of the front-end interface card in the embodiments of the present disclosure. The processor may be an FPGA, an ASIC, a CPU, or other hardware. Alternatively, an FPGA or other hardware and a CPU together serve as a processor. In an implementation of the chip provided in this embodiment of the present disclosure, the first interface, the second interface, and the processor may be presented in a product form of an intellectual property core, and are respectively corresponding to different intellectual property cores.

The present disclosure provides a computer-readable storage medium. The computer-readable storage medium stores an instruction, and when executing the instruction, a processor is configured to perform functions of the front-end interface card in the embodiments of the present disclosure.

The present disclosure provides a computer program product including an instruction. When executing the instruction in the computer program product, a processor is configured to perform functions of the front-end interface card in the embodiments of the present disclosure.

The host provided in the embodiments of the present disclosure may be a physical host, or may be a virtual machine (VM). The front-end interface card provided in the embodiments of the present disclosure may directly communicate with an HBA of the host, or may communicate with the HBA of the host by using a switch. This is not limited in the embodiments of the present disclosure.

It may be understood that the memory mentioned in the embodiments of the present disclosure may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a RAM that is used as an external cache. Many forms of RAMs may be used, for example, a static RAM (SRAM), a dynamic RAM (DRAM), a synchronous DRAM (SDRAM), a double data rate (DDR) SDRAM, an enhanced synchronous DRAM (ESDRAM), a synchlink DRAM (SLDRAM), and a direct rambus (DR) RAM. Those are examples rather than limitative descriptions.

It should be noted that when the processor is a general-purpose processor, a digital signal processor (DSP), an ASIC, an FPGA, or another programmable logic device, discrete gate, transistor logic device, or discrete hardware component, the memory (storage module) may be integrated into the processor.

It should be noted that the memory described in this specification is intended to include but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a ROM, a RAM, a magnetic disk, or a compact disc.

What is claimed is:

1. A method for implementing storage service continuity by a front-end interface card in a storage system, wherein the method comprises:
    detecting a status of a first storage controller that is in a plurality of storage controllers of the storage system;
    selecting a second storage controller from the storage controllers for a host to process an access request when the first storage controller is in an abnormal state due to being offline, a power failure, an upgrade to the first storage controller, or unresponsiveness;
    sending, to the host when the first storage controller is in the abnormal state, an access request error message reporting an error status of the access request; and receiving, from the host and in response to the access request error message, the access request,
wherein the second storage controller is in the storage controllers and is different distinct from the first storage controller.

2. The method of claim 1, wherein when the first storage controller is in the abnormal state and the front-end interface card has not completely obtained a result of the access request that is processed by the first storage controller, the method further comprises:
obtaining, from the second storage controller, a processing result of the access request of the host; and
selecting, from the processing result, the result of the access request.

3. The method of claim 1, further comprising:
identifying that the first storage controller has changed from the abnormal state to a normal state; and
switching, in response to the identifying, a storage controller that processes a service request of the host from the second storage controller to the first storage controller.

4. The method of claim 1, further comprising communicatively coupling to the host through an Ethernet connection.

5. The method of claim 1, further comprising communicatively coupling to the host through a fiber channel.

6. The method of claim 1, further comprising communicatively coupling the front-end interface card to the storage controllers through a Peripheral Component Interconnect Express (PCIe) bus.

7. The method of claim 1, further comprising further selecting, based on performances of the storage controllers, the second storage controller.

8. The method of claim 1, wherein when the first storage controller is in the abnormal state and the front-end interface card has not completely obtained a result of the access request that is processed by the first storage controller, the method further comprises:
obtaining, from the second storage controller, a processing result of the access request;
determining whether a portion of the result of the access request is previously sent to the host;
generating, from the processing result, a remainder of the result of the access request not sent to the host; and
sending the remainder of the result of the access request.

9. A front-end interface card in a storage system, wherein the front-end interface card comprises:
a first interface configured to communicate with a host;
a second interface configured to communicate with a plurality of storage controllers of the storage system; and
a processor communicatively coupled to the first interface and the second interface and configured to:
detect a status of a first storage controller, wherein the first storage controller is in the storage controllers and configured to process an access request of the host;
select a second storage controller from the storage controllers for the host to process the access request when the first storage controller is in an abnormal state due to being offline, a power failure, an upgrade to the first storage controller, or unresponsiveness;
send, to the host when the first storage controller is in the abnormal state, an access request error message reporting an error status of the access request; and
again receive, from the host and in response to the access request error message, the access request,
wherein the second storage controller is in the storage controllers and is different distinct from the first storage controller.

10. The front-end interface card of claim 9, wherein when the first storage controller is in the abnormal state and the front-end interface card has not completely obtained a result of the access request processed by the first storage controller, the processor is further configured to:
obtain, from the second storage controller, a processing result of the access request; and
select, from the processing result, the result of the access request.

11. The front-end interface card of claim 9, wherein the processor is further configured to:
identify that the first storage controller has changed from the abnormal state to a normal state; and
switch, in response to identifying, a storage controller that processes a service request of the host from the second storage controller to the first storage controller.

12. The front-end interface card of claim 9, wherein the first interface is an Ethernet interface or a fiber channel interface.

13. The front-end interface card of claim 9, wherein the second interface is a Peripheral Component Interconnect Express (PCIe) bus.

14. The front-end interface card of claim 9, wherein the processor is further configured to select the second storage controller based on performance of the storage controllers.

15. The front-end interface card of claim 9, wherein when the first storage controller is in the abnormal state and the front-end interface card has not completely obtained a result of the access request processed by the first storage controller, the processor is further configured to:
obtain, from the second storage controller, a processing result of the access request;
determine whether a portion of the result of the access request is previously sent to the host;
generate, from the processing result, a remainder of the result of the access request not sent to the host; and
send the remainder of the result of the access request.

16. A storage system comprising:
a plurality of storage controllers comprising:
a first storage controller configured to process an access request of a host; and
a second storage controller that is different distinct from the first storage controller; and
a front-end interface card communicatively coupled to the storage controllers and the host and configured to:
detect a status of the first storage controller;
select the second storage controller for the host to process the access request when the first storage controller is in an abnormal state due to being offline, a power failure, an upgrade to the first storage controller, or unresponsiveness;
send, to the host when the first storage controller is in the abnormal state, an access request error message reporting an error status of the access request; and
again receive, from the host and in response to the access request error message, the access request.

17. The storage system of claim 16, wherein when the first storage controller is in the abnormal state and the front-end interface card has not completely obtained a result of the access request that is processed by the first storage controller, the front-end interface card is further configured to:
obtain, from the second storage controller, a processing result of the access request; and select, from the processing result, the result of the access request.

18. The storage system of claim 16, wherein the front-end interface card is further configured to:
identify that the first storage controller has changed from the abnormal state to a normal state; and
switch, in response to identifying, a storage controller that processes a service request from the second storage controller to the first storage controller.

19. The storage system of claim 16, wherein the front-end interface card is coupled to the host through an Ethernet or a fiber channel.

20. The storage system of claim 16, wherein the front-end interface card is coupled to the storage controllers through a Peripheral Component Interconnect Express (PCIe) bus.

21. The storage system of claim 16, wherein the front-end interface card is further configured to select the second storage controller based on performance of the storage controllers.

22. The storage system of claim 16, wherein when the first storage controller is in the abnormal state and the front-end interface card has not completely obtained a result of the access request that is processed by the first storage controller, the front-end interface card is further configured to:
obtain, from the second storage controller, a processing result of the access request;
determine whether a portion of the result of the access request is previously sent to the host;
generate, from the processing result, a remainder of the result of the access request not sent to the host; and
send the remainder of the result of the access request.

* * * * *